US012587449B2

(12) United States Patent
Chis et al.

(10) Patent No.: US 12,587,449 B2
(45) Date of Patent: Mar. 24, 2026

(54) ANALYZING OPERATION OF COMMUNICATIONS NETWORK

(71) Applicant: Elisa Oyj, Helsinki (FI)

(72) Inventors: Adriana Chis, Helsinki (FI); Petteri Lundén, Helsinki (FI)

(73) Assignee: Elisa Oyj, Helsinki (FI)

( * ) Notice: Subject to any disclaimer, the term of this patent is extended or adjusted under 35 U.S.C. 154(b) by 54 days.

(21) Appl. No.: 18/702,827

(22) PCT Filed: Oct. 27, 2022

(86) PCT No.: PCT/FI2022/050705
§ 371 (c)(1),
(2) Date: Apr. 19, 2024

(87) PCT Pub. No.: WO2023/084146
PCT Pub. Date: May 19, 2023

(65) Prior Publication Data
US 2024/0414065 A1 Dec. 12, 2024

(30) Foreign Application Priority Data
Nov. 9, 2021 (FI) ..................................... 20216151

(51) Int. Cl.
*H04L 41/16* (2022.01)
*H04L 41/142* (2022.01)
(Continued)

(52) U.S. Cl.
CPC ............ *H04L 41/16* (2013.01); *H04L 41/142* (2013.01); *H04L 41/147* (2013.01); *H04L 41/149* (2022.05)

(58) Field of Classification Search
CPC ..... H04L 41/16; H04L 41/142; H04L 41/145; H04L 41/147; H04L 43/04; H04L 67/10;
(Continued)

(56) References Cited

U.S. PATENT DOCUMENTS

2008/0270071 A1 10/2008 Marvasti et al.
2012/0150489 A1* 6/2012 Dhurandhar ............ G06F 17/18
702/179
(Continued)

FOREIGN PATENT DOCUMENTS

FI 20215028 4/2022
WO 2015/055259 A1 4/2015
(Continued)

OTHER PUBLICATIONS

Fryzlewicz, P. Wild binary segmentation for multiple change-point detection. In: The Annals of Statistics, 2014. vol. 42, No. 6, pp. 2243-2281. DOI: 10.1214/14-AOS 1245. Institute of Mathematical Statistics.

*Primary Examiner* — Djenane M Bayard
(74) *Attorney, Agent, or Firm* — Espatent Oy

(57) ABSTRACT
Analysis of operation of a communications network. The analysis is performed by obtaining (301) time series of performance data of a cell of the communications network; selecting (302) a change point in the time series; determining (303) a first linear regression model before the selected change point and a second linear regression model after the selected change point; determining (304) offset difference between the first linear regression model and the second linear regression model; and determining (306) anomaly type based on the offset difference.

17 Claims, 5 Drawing Sheets

(51) Int. Cl.
    *H04L 41/147*     (2022.01)
    *H04L 41/149*     (2022.01)

(58) Field of Classification Search
    CPC ... H04L 41/5009; H04L 9/50; H04L 2209/56; H04L 41/22; H04L 63/1425; H04L 43/0852; H04L 43/16; H04L 41/40; H04L 43/045; H04L 43/0817; H04L 63/00; H04L 63/10; H04L 43/0876; H04L 67/12; H04L 41/069; H04L 67/61; H04L 41/0604; H04L 67/535; H04L 43/065; H04L 43/08; H04L 43/067; H04L 63/1416; H04L 69/40; H04L 67/566; H04L 43/10; H04L 67/53; H04L 67/565; H04L 67/5651; H04L 67/60; H04L 69/16; H04L 41/0681; H04L 41/0886; H04L 43/0823; H04L 41/046; H04L 63/029; H04L 63/102; H04L 67/34; H04L 41/0631; H04L 41/149; H04L 41/0894; H04L 41/0896; H04L 1/242; H04L 41/0213; H04L 41/0273; H04L 41/0622; H04L 41/064; H04L 41/0663; H04L 41/0686; H04L 41/0823; H04L 41/0895; H04L 41/344; H04L 43/026; H04L 47/122; H04L 47/125; H04L 47/70; H04L 47/822; H04L 47/826; H04L 47/83; H04L 63/02; H04L 63/1466; H04L 63/20; H04L 67/101; H04L 12/2827; H04L 12/283; H04L 41/0816; H04L 41/5016; H04L 12/4633; H04L 41/12; H04L 43/0864; H04L 43/0888; H04L 5/003; H04L 67/303; H04L 1/24; H04L 2025/03808; H04L 25/0212; H04L 25/0216; H04L 25/03343; H04L 27/2662; H04L 27/2679; H04L 2025/03382; H04L 25/0204; H04L 25/0242; H04L 25/03038; H04W 4/80; H04W 12/08; H04W 12/122; H04W 12/61; H04W 12/63; H04W 16/26; H04W 28/0236; H04W 28/04; H04W 28/18; H04W 36/008375; H04W 36/0094; H04W 36/16; H04W 36/20; H04W 36/38; H04W 4/02; H04W 4/023; H04W 4/029; H04W 4/30; H04W 4/70; H04W 40/246; H04W 48/02; H04W 72/0453; H04W 72/541; H04W 72/542; H04W 76/11; H04W 76/15; H04W 8/005; H04W 80/06; H04W 84/045; H04W 84/105; H04W 84/12; H04W 84/18; H04W 88/08; H04W 88/10; H04W 92/20; H04W 24/08; H04W 24/04; H04W 4/33; H04W 64/00

See application file for complete search history.

(56)            References Cited

U.S. PATENT DOCUMENTS

| | | | |
|---|---|---|---|
| 2016/0062950 | A1* | 3/2016 | Brodersen ........... G06F 18/2433 |
| | | | 702/181 |
| 2016/0217022 | A1* | 7/2016 | Velipasaoglu .......... G06F 11/32 |
| 2017/0322877 | A1* | 11/2017 | Chan ................... G06F 11/3037 |
| 2019/0081969 | A1 | 3/2019 | Phadke et al. |
| 2019/0235944 | A1 | 8/2019 | Velipasaoglu et al. |
| 2019/0370610 | A1* | 12/2019 | Batoukov ........... G06F 11/0709 |
| 2021/0281486 | A1* | 9/2021 | Singh Bawa ....... H04L 41/0896 |
| 2021/0373514 | A1* | 12/2021 | Kim .................... G05B 13/048 |

FOREIGN PATENT DOCUMENTS

| | | | |
|---|---|---|---|
| WO | 2021/048311 | A1 | 3/2021 |
| WO | 2021/215720 | A1 | 10/2021 |

\* cited by examiner

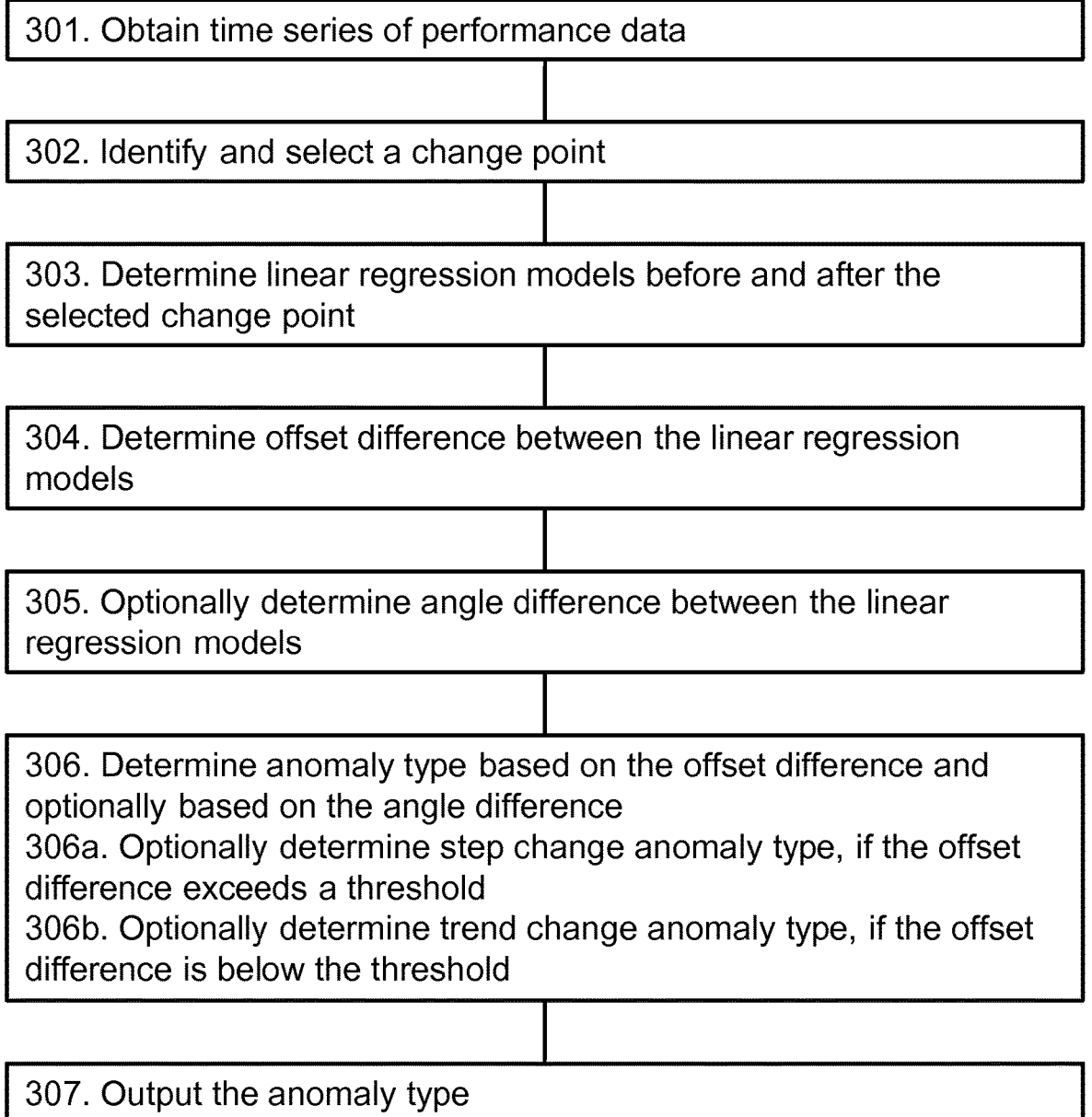

301. Obtain time series of performance data

302. Identify and select a change point

303. Determine linear regression models before and after the selected change point 304. Determine offset difference between the linear regression models 305. Optionally determine angle difference between the linear regression models 306. Determine anomaly type based on the offset difference and optionally based on the angle difference
306a. Optionally determine step change anomaly type, if the offset difference exceeds a threshold
306b. Optionally determine trend change anomaly type, if the offset difference is below the threshold 307. Output the anomaly type

Fig. 3

ANALYZING OPERATION OF COMMUNICATIONS NETWORK

TECHNICAL FIELD

The present disclosure generally relates to analysis of operation of a communications network.

BACKGROUND

This section illustrates useful background information without admission of any technique described herein representative of the state of the art.

Cellular communications networks comprise a plurality of cells serving users of the network. There are various factors that affect operation of individual cells and co-operation between the cells. In order for the communications network to operate as intended and to provide planned quality of service, cells of the communications network need to operate as planned.

There are various automated measures that monitor operation of the communications networks in order to detect problems as soon as possible so that corrective actions can be taken. For example, patent application FI20215028 and patent publication US2019081969 teach using change point detection or anomaly detection methods for identifying anomalously behaving cells.

Now a new approach is taken to analyzing operation of a communications network.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for analysis of of operation of a communications network. In an example case, the method is performed by obtaining time series of performance data of a cell of the communications network;

selecting a change point in the time series;

determining a first linear regression model before the selected change point and a second linear regression model after the selected change point;

determining offset difference between the first linear regression model and the second linear regression model; and determining anomaly type based on the offset difference.

In some embodiments, selecting the change point comprises selecting a change point which represents most significant change in the time series.

In some embodiments, a binary segmentation algorithm is used for selecting the change point which represents most significant change in the time series.

In some embodiments, selecting the change point comprises selecting a change point associated with degradation in the performance data.

In some embodiments, determining the offset difference comprises determining difference between the last point of the first linear regression model and the first point the second linear regression model.

In some embodiments, the method further comprises determining angle difference between the first linear regression model and the second linear regression model and using the angle difference in determining the anomaly type.

In some embodiments, the method further comprises outputting the determined anomaly type for use in management of operation of the communications network.

In some embodiments, the method further comprises preprocessing the time series of performance data by applying a smoothening function to extract min, max, and/or average values of the time series of performance data.

In some embodiments, the method further comprises determining that the anomaly type is a step change if the offset difference exceeds a preset threshold and determining that the anomaly type is a trend change if the offset difference is below the preset threshold.

In some embodiments, the preset threshold is 3-10% of dynamic range of the performance data.

In some embodiments, the preset threshold is 3 dB for performance data related to received power level.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fourth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage;

phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow chart according to an example embodiment; and

DETAILED DESCRIPTION

In the following description, like reference signs denote like elements or steps.

In arrangements, where analysis of operation of a communications network is based on change point detection or other anomaly detection methods for identifying anomalously behaving cells, the corrective action that is needed may depend on the type of the anomaly that is detected. Various embodiments of present disclosure provide automated mechanisms to determine type of the detected change point. In this way, automatically performed corrective actions and/or automatic root cause analysis are enabled or at least possibilities for such automation are improved.

For example, some change points in performance data of a communications network are result of intentional network changes such as manual or automatic adjustments made in the network settings. Such intentional changes may lead to a step change in performance data. Another source of anomalies are network faults. Network faults may lead to a trend change in the performance data, i.e. to a degradation of performance over a longer period of time. For example, cooling fans or wires that deteriorate over time may lead to a trend change in performance data. As another example, sudden network hardware breakdown may lead to a step change. By being able to automatically distinguish different change points, further automation possibilities are improved.

In embodiments of present disclosure, performance data of a communications network is analysed. The following is a non-exclusive list of possible performance variables included in the performance data: throughput, cell availability, handover failure or success rate, reference signal received power, RSRP, reference signal received quality, RSRQ, received signal strength indicator, RSSI, signal to noise ratio, SNR, signal to interference plus noise ratio, SINR, received signal code power, RSCP, and channel quality indicator, CQI. Other performance variables may be used, too.

Figure 1:
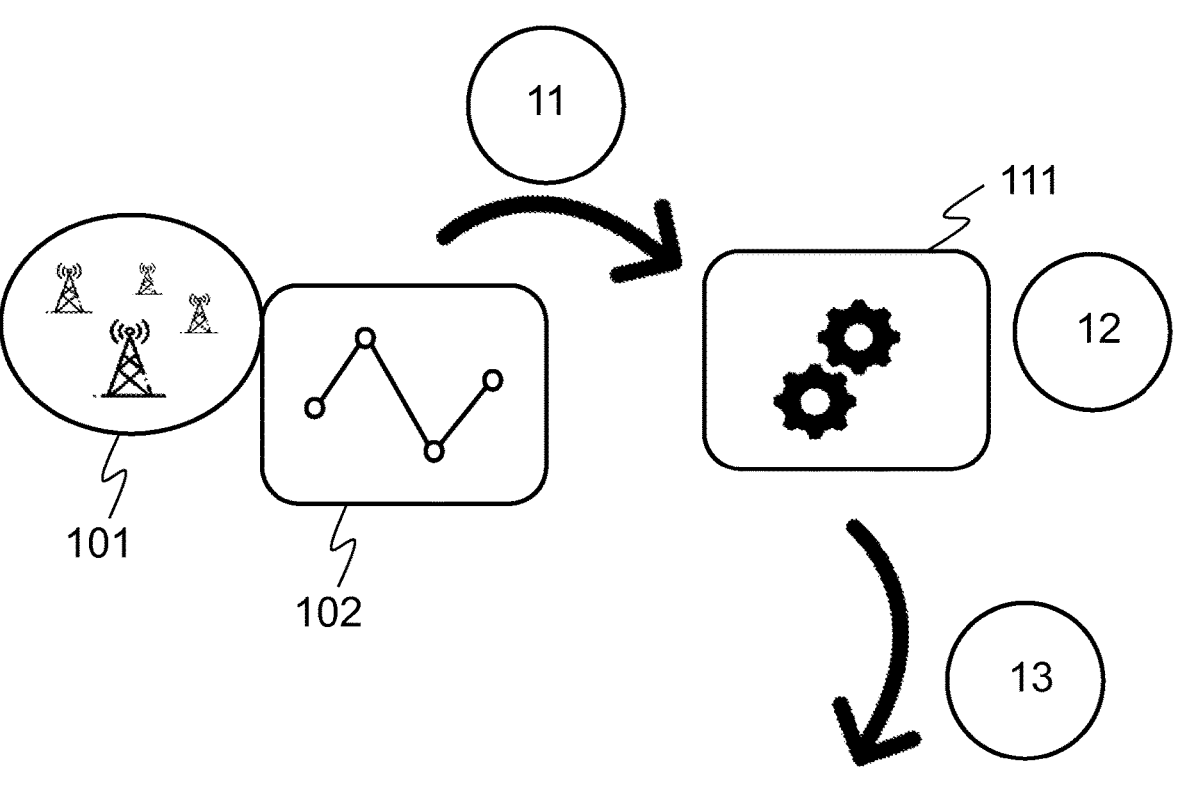
FIG. 1 schematically shows an example scenario according to an embodiment.

FIG. 1 schematically shows an example scenario according to an embodiment. The scenario shows a communications network 101 comprising a plurality of cells and base stations and other network devices, and an operations support system, OSS, 102 configured to manage operations of the communications network 101. Further, the scenario shows an automation system 111. The automation system 111 is configured to implement automated analysis of operation of the communications network 101. The automation system 111 is operable to interact with the OSS 102 for example to receive performance data from the OSS 102.

The automation system 111 is configured to implement at least some example embodiments of present disclosure.

In an example embodiment the scenario of FIG. 1 operates as follows: In phase 11, the automation system 111 receives performance data comprising values of performance indicators and/or other performance data from the communications network 101 e.g. through the OSS 102.

In phase 12, the performance data is automatically analysed in the automation system 111 to identify anomalies and their types.

In phase 13, the results of the analysis are output for further processing. The further processing may be performed manually or automatically. The results of the analysis may be shown on a display, a dashboard, as trouble tickets, or otherwise output to a user. The user may then use the results for management of the communications network in order to solve problems that may exist in the communications network. Additionally or alternatively, the results of the analysis may be directly provided to other automated processes running in the automation system 111 or elsewhere. The results of the analysis may be used for identifying cells that likely require maintenance or corrective actions, for performing root cause analysis, and/or for deciding on required corrective actions (such as resets or parameter adjustments).

The analysis performed in the automation system 111 may be automatically or manually triggered. The analysis may be periodically repeated.

Figure 2:
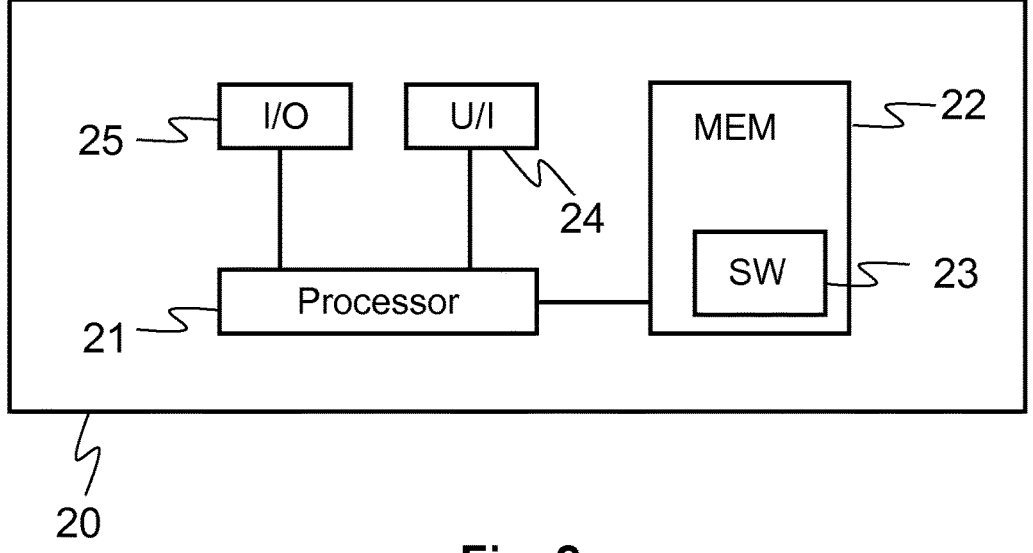
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of present disclosure. That is, with suitable configuration the apparatus 20 is suited for operating for example as the automation system 111 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RFID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

FIG. 3 shows a flow chart according to an example embodiment. FIG. 3 illustrates a process comprising various possible steps including some optional steps while also further steps can be included and/or some of the steps can be performed more than once. The process may be implemented in the automation system 111 of FIG. 1 and/or in the apparatus 20 of FIG. 2. The process is implemented in a computer program code and does not require human interaction unless otherwise expressly stated. It is to be noted that the process may however provide output that may be further processed by humans and/or the process may require user input to start. The process comprises the following phases:

301: Time series of performance data of a cell of the communications network are obtained. The performance data may comprise time series of performance indicator data, alarm data and/or probe data. At minimum the performance data comprises time series of one performance variable, but the performance data may comprise time series of a plurality of performance variables. Still further, the performance data may comprise data collected from multiple cells, possibly aggregated e.g. at sector or site level. Obtained performance data may be processed sequentially (e.g. time series of one performance variable at a time) or simultaneously (e.g. multiple time series in parallel or in aggregated form).

The time period that the time series covers may vary depending on the implementation. As an example, the time period may be past two weeks, 1-2 months or some other suitable period. Considering the application area of communications networks, suitable time periods are likely to cover multiple days so that daily variation (seasonality) in network usage does not affect the analysis results.

Figure 4:
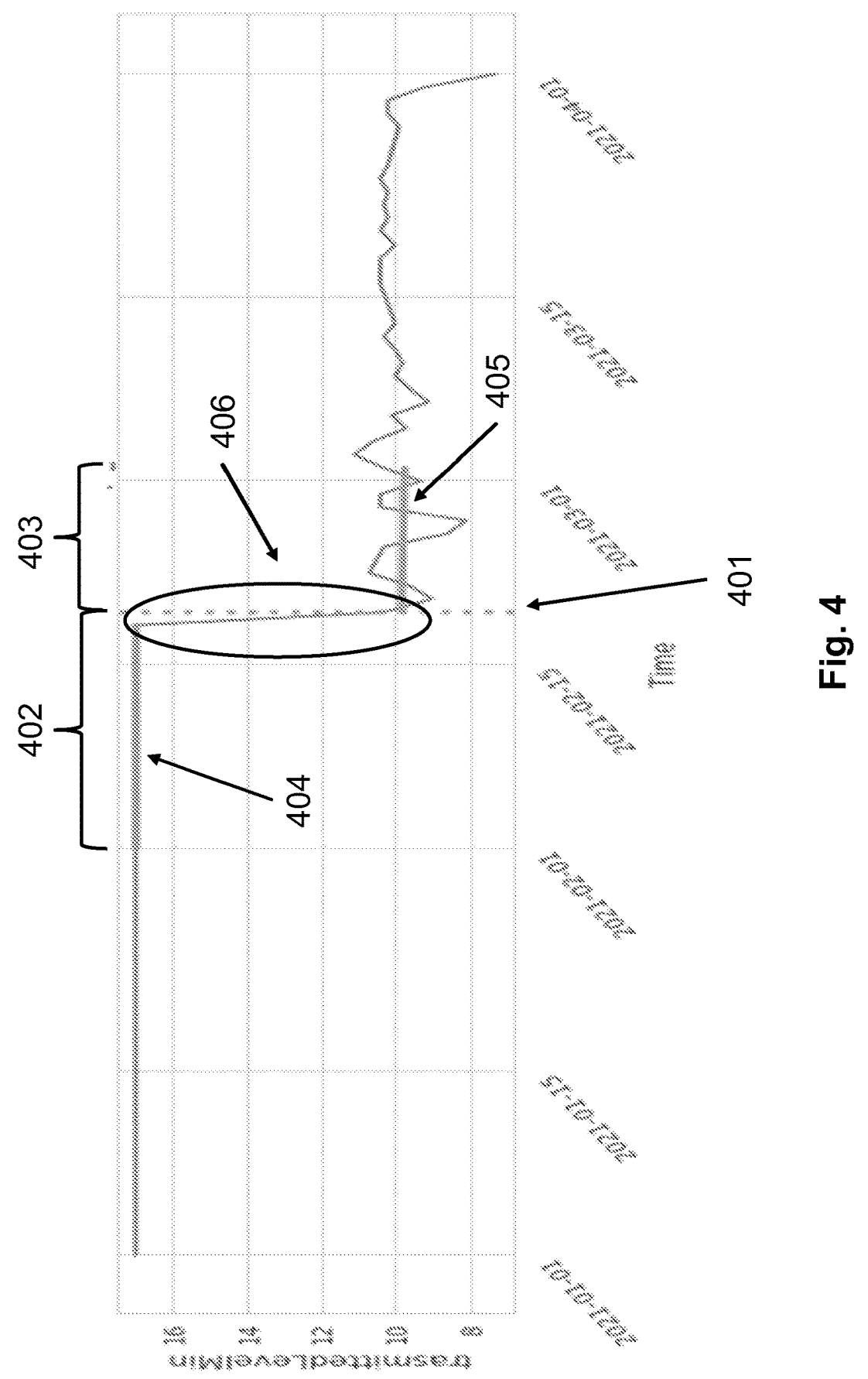
FIGS. 4-6 shows charts illustrating some example embodiments.
Figure 5:
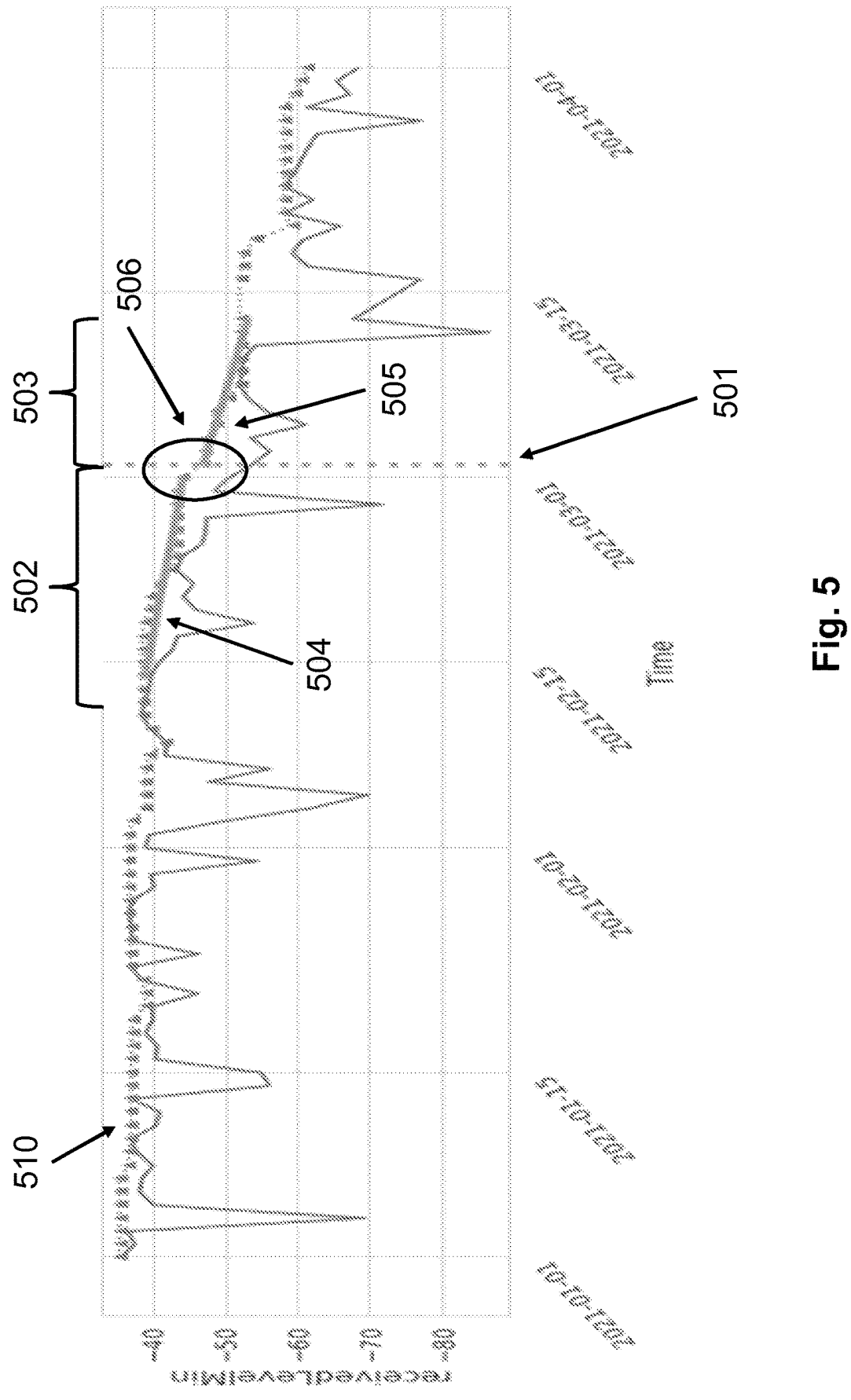
Figure 6:
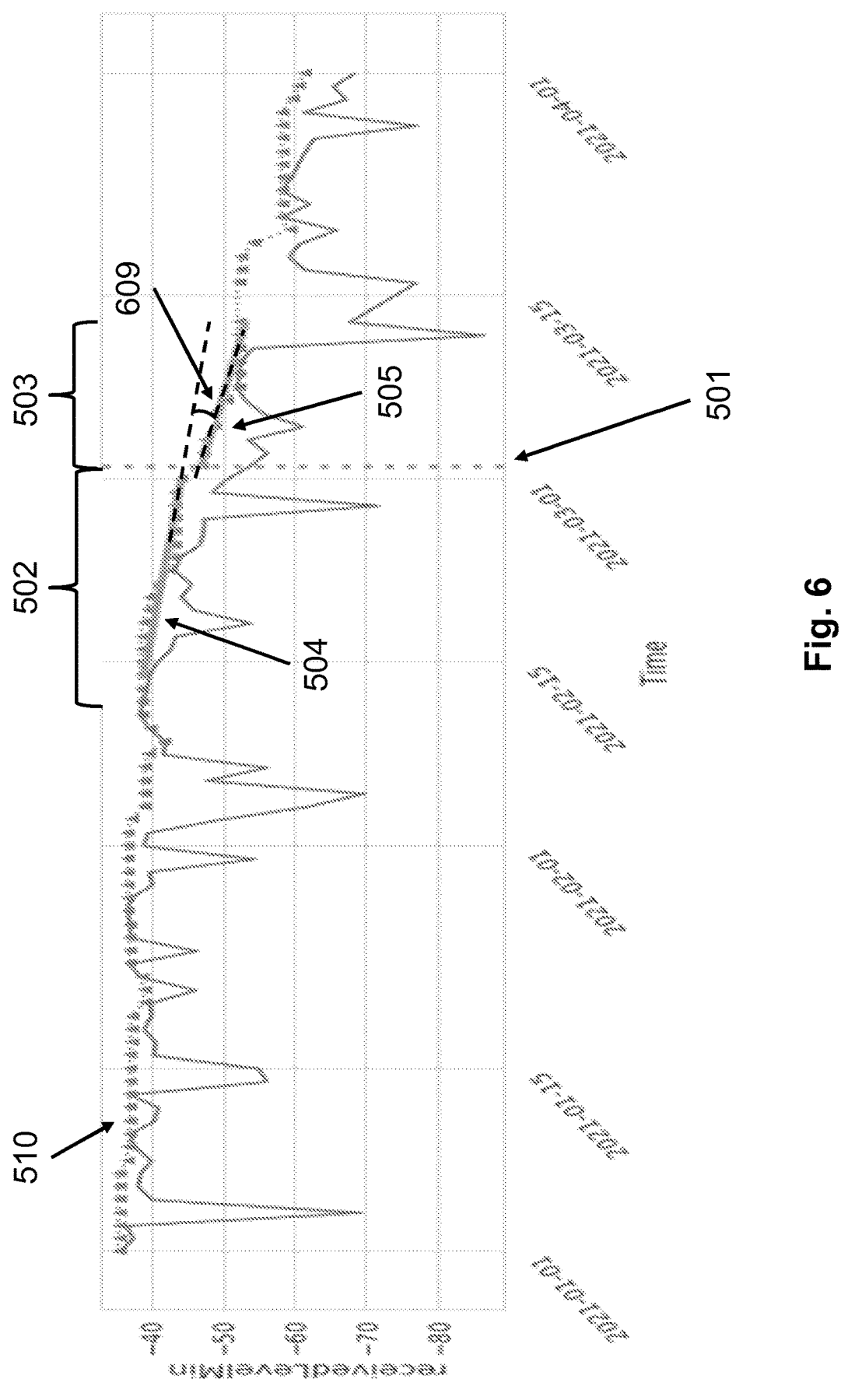

FIGS. 4-6 show examples of time series of performance data. FIG. 4 shows minimum of transmitted signal level over a time period. FIGS. 5 and 6 show minimum of received signal level over a time period. It is to be noted that these are non-limiting examples to illustrate some features of present disclosure.

302: The performance data is analysed in order to detect anomalies in the time series. In an embodiment, the detected anomalies are change points.

The following is non-exclusive list of possible methods or models that can be used for detecting change points: statistical change point detection, prediction error based approaches, PCA based approaches, autoencoder reconstruction error, binary segmentation algorithm, Pruned Exact Linear Time (PELT) algorithm, Z-score based method. Other methods or models may be used, too.

At least one of the detected change points is selected for further analysis. In an embodiment a change point which represents most significant change in the time series is selected. For example, a binary segmentation algorithm may be used for selecting the change point which represents most significant change in the time series. It is to be noted that also some other criteria may be used and/or all identified change points may be analysed.

In an embodiment, only change points that are associated with degradation in performance data are selected for further processing. The reason is that usually improvements in performance are desirable and therefore do not require further analysis. Analysis of the improvement is however equally possible. That is, it is not mandatory to limit the analysis to degradations in performance data.

303: A line is fitted to the time series of performance data before and after the selected change point. In an embodiment, this is performed by fitting linear regression models before and after the selected change point. More particularly, this may be performed by determining a first linear regression model before the selected change point and determining a second linear regression model after the selected change point.

A predefined observation window before and after the change point may be used for determining the first and the second regression models. The length of the observation window may be the same before and after the change point or these may differ from each other. In general the observation window needs to be such that it covers a plurality of data points in order to be able perform the line fitting.

FIG. 4 shows a first change point 401 and a first regression model line 404 fitted to data points in a first observation window 402 before the first change point 401 and a second regression model line 405 fitted to data points in a second observation window 403 after the first change point 401. FIGS. 5 and 6 show a second change point 501 and a third regression model line 504 fitted to data points in a third observation window 503 before the second change point 501 and the fourth regression model line 505 fitted to data points in a fourth observation window 503 after the second change point 501.

In an embodiment, the analysis in phases 302 and 303 is performed on raw performance data that is obtained from the communications network. Alternatively, the performance data may be preprocessed for example by a smoothening function. The smoothening function may extract min, max, and/or average values of the time series of performance data. In this way, e.g. isolated drops or peaks may be removed from the data that is to be analyzed or the analysis may be always performed on the maximum or minimum observed values.

The preprocessing may be performed as a first step of the analysis, i.e. before identifying and selecting the change points. Further, it may be possible to perform preprocessing later in the process, e.g. after selection of the change point but prior to fitting the regression models before and after the selected change point FIGS. 5 and 6 show maximum smoothening 510 applied on the performance data prior to finding the change point 501 and fitting the regression models before and after the change point 501.

304: Offset difference between the linear regression models is determined. The offset difference is distance or difference between the fitted lines at the change point.

The offset difference may be for example difference between the last point of the first fitted line (the one before change point) and the first point of the second fitted line (the one after the change point). Alternatively or additionally, difference may be calculated between mean values of the fitted lines for example.

FIG. 4 shows a first example of offset difference 406 between the first regression model line 404 and the second regression model line 405 and FIG. 5 shows a second example of offset difference 506 between the third regression model line 504 and the fourth regression model line 505.

The difference or distance in offset may be measured in absolute terms or as a relative difference (for example, a drop of 20%).

305: Optionally, also an angle difference between the linear regression models is determined.

FIG. 6 shows an example of angle difference 609 between the third regression model line 504 and the fourth regression model line 505.

306: Anomaly type is determined based on the offset difference. E.g. a large offset difference may lead to different anomaly type than a small offset difference. Optionally also the angle difference may be used in this phase. The angle difference gives an indication of steepness of the change in the performance data. Small angle indicates a slow change and large angle indicates a fast change. In this way, the anomaly type can be determined more accurately.

306*a*: In a non-limiting example, a step change anomaly type is determined if the offset difference exceeds a preset threshold. In this way, a step change anomaly type is determined if the offset difference is relatively large.

306*b*: In addition to phase 306*a* or as an alternative to phase 306*a*, a trend change anomaly type may be determined if the offset difference is below the preset threshold. In this way, a trend change anomaly type is determined if the offset difference is small or approaching zero.

The preset threshold depends on the performance data that is being analysed and the threshold may be adjusted by a user. By way of example, the preset threshold may be for example 3-10% or around 5% of dynamic range of the performance data. In an example case, wherein the performance data is related to received power level, the preset threshold may be set to 3 dB.

307: The determined anomaly type is output for further processing phases. The determined anomaly type may be used for example in manual or automatic management of operation of the communications network.

Without in any way limiting the scope, interpretation, or application of the appended claims, a technical effect of one or more of the example embodiments disclosed herein is clearly defined mechanism for identifying anomaly type in time series data. In this way there is no need to decide on the following actions solely based on detecting an anomaly. Instead, anomaly type can be taken into account, too. The identified anomaly type may then be used in further analysis and for example in management of operation of the communications network. The identified anomaly type may be used for identifying an associated network problems and/or a root cause of associated network problems. Consequently, the identified anomaly type may be used for solving network problems.

A further technical effect of some embodiments is ability to distinguish whether a change point is a step change or a trend change.

A further technical effect of some embodiments is that further automated analysis of network problems is enabled. Different anomaly types may require different kind of further analysis. As different anomaly types are automatically identified, the following analysis can be automatically adapted to identified anomaly type. For example, root cause analysis can be automated. In this way efficiency of automated analysis may be improved. As more automation is enabled the process may be faster as human involvement is not needed.

Any of the afore described methods, method steps, or combinations thereof, may be controlled or performed using hardware; software; firmware; or any combination thereof. The software and/or hardware may be local; distributed;

centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for analysis of operation of a communications network comprising:
    obtaining time series of performance data of a cell of the communications network;
    selecting a change point in the time series;
    determining a first linear regression model before the selected change point and a second linear regression model after the selected change point;
    determining offset difference between the first linear regression model and the second linear regression model;
    determining anomaly type based on the offset difference; and
    determining an angle difference between the first linear regression model and the second linear regression model and using the angle difference in determining the anomaly type.

2. The method of claim 1, wherein selecting the change point comprises selecting a change point which represents the most significant change in the time series.

3. The method of claim 2, wherein a binary segmentation algorithm is used for selecting the change point which represents the most significant change in the time series.

4. The method of claim 2, wherein selecting the change point comprises selecting a change point associated with degradation in the performance data.

5. The method of claim 2, wherein determining the offset difference comprises determining difference between the last point of the first linear regression model and the first point the second linear regression model.

6. The method of claim 3, wherein selecting the change point comprises selecting a change point associated with degradation in the performance data.

7. The method of claim 3, wherein determining the offset difference comprises determining difference between the last point of the first linear regression model and the first point the second linear regression model.

8. The method of claim 1, wherein selecting the change point comprises selecting a change point associated with degradation in the performance data.

9. The method of claim 8, wherein determining the offset difference comprises determining difference between the last point of the first linear regression model and the first point the second linear regression model.

10. The method of claim 1, wherein determining the offset difference comprises determining difference between the last point of the first linear regression model and the first point the second linear regression model.

11. The method of claim 1, further comprising outputting the determined anomaly type for use in management of operation of the communications network.

12. The method of claim 1, further comprising preprocessing the time series of performance data by applying a smoothening function to extract min, max, and/or average values of the time series of performance data.

13. The method of claim 1, further comprising determining that the anomaly type is a step change if the offset difference exceeds a preset threshold and determining that the anomaly type is a trend change if the offset difference is below the preset threshold.

14. The method of claim 13, wherein the preset threshold is 3-10% of dynamic range of the performance data.

15. The method of claim 13, wherein the preset threshold is 3 dB for performance data related to received power level.

16. An apparatus comprising:

a memory section comprising computer executable program code; and a processing section configured to cause the apparatus to perform, when executing the program code, the method of claim 1.

17. A non-transitory computer readable medium having stored thereon a computer program comprising computer executable program code which when executed in an apparatus causes the apparatus to perform the method of claim 1.

* * * * *